(12) United States Patent
Brück

(10) Patent No.: US 10,634,033 B2
(45) Date of Patent: Apr. 28, 2020

(54) TANK SYSTEM FOR A REDUCING AGENT

(71) Applicant: Continental Automotive GmbH, Hannover (DE)

(72) Inventor: Rolf Brück, Bergisch Gladbach (DE)

(73) Assignee: Continental Automotive GmbH, Hannover (DE)

( * ) Notice: Subject to any disclaimer, the term of this patent is extended or adjusted under 35 U.S.C. 154(b) by 42 days.

(21) Appl. No.: 16/060,892

(22) PCT Filed: Dec. 7, 2016

(86) PCT No.: PCT/EP2016/080017
§ 371 (c)(1),
(2) Date: Jun. 8, 2018

(87) PCT Pub. No.: WO2017/097808
PCT Pub. Date: Jun. 15, 2017

(65) Prior Publication Data
US 2018/0371976 A1    Dec. 27, 2018

(30) Foreign Application Priority Data
Dec. 10, 2015 (DE) ......................... 10 2015 224 904

(51) Int. Cl.
*F01N 3/20* (2006.01)
(52) U.S. Cl.
CPC ........... *F01N 3/208* (2013.01); *F01N 3/2066* (2013.01); *F01N 2240/16* (2013.01); *F01N 2560/12* (2013.01); *F01N 2610/02* (2013.01); *F01N 2610/10* (2013.01); *F01N 2610/105* (2013.01); *F01N 2610/142* (2013.01); *F01N 2610/1406* (2013.01); *F01N 2610/1486* (2013.01); *Y02T 10/24* (2013.01)

(58) Field of Classification Search
CPC combination set(s) only.
See application file for complete search history.

(56) References Cited

U.S. PATENT DOCUMENTS

| 8,088,336 B2* | 1/2012 | Suzuki | B01B 1/005 422/148 |
|---|---|---|---|
| 8,429,900 B2* | 4/2013 | Knetsch | B01D 53/90 60/286 |
| 2004/0217103 A1 | 11/2004 | Knetsch et al. | |
| 2010/0078426 A1* | 4/2010 | Li | F01N 3/2066 219/600 |
| 2012/0103433 A1* | 5/2012 | Koonce | F02M 31/125 137/341 |

(Continued)

FOREIGN PATENT DOCUMENTS

| DE | 102009046954 | 5/2011 |
|---|---|---|
| EP | 2336515 | 6/2011 |

(Continued)

*Primary Examiner* — Binh Q Tran
(74) *Attorney, Agent, or Firm* — Cozen O'Connor

(57) ABSTRACT

A tank system for a reducing agent includes: a vessel configured to store the reducing agent, the vessel having: an upper vessel wall, lateral vessel walls, and a lower vessel wall configured to form a base of the vessel; and a heating device disposed in the vessel. At least parts of the heating device are disposed in a part of the base of the lower vessel wall of the vessel.

9 Claims, 2 Drawing Sheets

(56) References Cited

U.S. PATENT DOCUMENTS

| | | | | |
|---|---|---|---|---|
| 2013/0255234 A1* | 10/2013 | Bauer | ................... | F01N 3/2066 |
| | | | | 60/287 |
| 2015/0090724 A1* | 4/2015 | Gross | ................... | F01N 3/2066 |
| | | | | 220/562 |
| 2015/0210159 A1 | 7/2015 | Maguin et al. | | |
| 2016/0138455 A1* | 5/2016 | Chini | ................... | F01N 3/2066 |
| | | | | 392/447 |

FOREIGN PATENT DOCUMENTS

| | | |
|---|---|---|
| WO | WO2012/152498 A1 | 11/2012 |
| WO | WO 2013/142188 A1 | 9/2013 |
| WO | WO 2014/037210 A1 | 3/2014 |
| WO | WO 2014/202268 A1 | 12/2014 |

\* cited by examiner

TANK SYSTEM FOR A REDUCING AGENT

CROSS REFERENCE TO RELATED APPLICATIONS

This is a U.S. national stage of application No. PCT/EP2016/080017 filed on Dec. 7, 2016, which claims priority to the Germany Application No. 10 2015 224 904.2 filed Dec. 10, 2015, the content of both incorporated herein by reference.

BACKGROUND OF THE INVENTION

1. Field of the Invention

The invention relates to a tank system for a reducing agent.

2. Related Art

It is known for reducing agents to be added to the exhaust gases of motor vehicles to reduce undesirable component parts, in particular nitrogen oxide compounds, of the exhaust gas, in that nitrogen oxide compounds are converted to other compounds such as nitrogen, water, and carbon dioxide. A 32.5% urea solution which is also available under the AdBlue trademark, is used herein as the reducing agent. A vessel from which the urea solution is conveyed to the exhaust gas line is provided for providing and storing the urea solution in motor vehicles. The urea solutions that are usually used freeze at approx. −11° C. Situations in which the urea solution freezes are also encountered when antifreeze agents are used. To this end, it is known for a heating device that always guarantees the provision of a liquid and thus conveyable reducing agent when required to be disposed in the vessel. The heating device herein can be disposed on the vessel wall or on a conveying device by way of which the reducing agent is conveyed out of the vessel. Known heating devices have a heat conducting structure for the heat to be distributed across a large area. The complex fastening of the heating device, in particular of the heat conducting structure, to the vessel wall is disadvantageous. Moreover, the heat conducting structure is stressed by the pressure that is created when the urea solution freezes.

SUMMARY OF THE INVENTION

It is therefore an object of the present invention to achieve a tank system that provides for a reliable provision of a liquid reducing agent to be guaranteed under all operating conditions.

According to one aspect of the invention, the object may be achieved according to the invention by a tank system for a reducing agent, the system including a vessel for the reducing agent, having an upper vessel wall, lateral vessel walls, and a lower vessel wall, and a heating device disposed in the vessel. At least parts of the heating device are disposed in the lower vessel wall of the vessel.

By disposing at least parts of the heating device in the lower vessel wall of the vessel, fastening to the inner side of the lower vessel wall is dispensed with. By virtue of the deletion of corresponding fastenings, the lower vessel wall can be of a significantly simpler construction since at least parts of the heating device are disposed in a protected environment and cannot be influenced by the ice pressure of frozen urea solution. The disposal in the lower vessel wall furthermore causes a heating of the urea solution in this region such that liquid reducing agent is provided in the lower region of the vessel, emptying being possible up to this region.

In order for the base region to be heated across a large area, heating elements configured in a corresponding size, or a plurality of heating elements, are required. According to one advantageous aspect, the number of heating elements, or the size of the latter, can be minimized in that parts of the heating device that are disposed in the base of the vessel are heat conducting structures. The disposal of heat conducting structures enables a heat transmission in a simple manner. Moreover, heat conducting structures are more readily adaptable to geometric conditions than heating elements.

In one particularly advantageous aspect, the heat conducting structure disposed in the lower vessel wall and thus in the base of the vessel has a main body, wherein the main body has shaped elements that extend away from the main body such that regions of the shaped elements penetrate the lower vessel wall. The main body imparts the required stability to the heat conducting structure, while the shaped elements are provided almost exclusively for heating the urea solution.

In a simple and cost-effective aspect, the regions of the shaped elements that penetrate the base of the vessel penetrate the base on at least one side of the base, preferably on the inner side of the lower vessel wall.

In another aspect, the heat-generating parts of the heating device, these being understood to be the heating elements, are disposed in the base of the vessel. Only the electrical connectors connected to the heat-generating parts are routed out of the base of the vessel. These connectors can be connector lines or plug connections. In as far as the heating device is composed exclusively of heating elements, the heating device is thus completely disposed in the lower vessel device. If the heating device moreover comprises heat conducting structure, the latter can likewise be disposed conjointly with the heating elements in the lower vessel wall.

According to a further advantageous aspect, in which not all parts of the heating device are disposed in the lower vessel wall, the part of the heating device that is not disposed in the lower vessel wall and thus in the interior of the vessel can comprise at least one support on which further components required for the operation of the tank system are disposed. Such components can toe filters or sensors. The at least one support can be connected to the main body of the heat conducting structure, or to one or a plurality of shaped elements. It is likewise possible for supports to be disposed on the heating elements or on the connectors for the electrical contact of the heating elements. The support herein can be configured so as to be integral to the corresponding part of the heating device, or can be connected thereto in an integral manner. The provision of at least one support has the advantage that the support can be configured in a manner corresponding to the disposal of the respective component. The corresponding configuration is understood as the positioning of the respective component in the vessel and/or the fastening to the support. The support can thus support, for example, a filling level sensor, wherein the support is configured in such a manner that the filling level sensor is positionable at the lowest point, a point that is sufficiently deep for the measurement, or so as to be referenced to the base, meaning so as to be in contact with the inner side of the lower vessel wall.

By way of the disposal of at least parts of the heating device in the lower vessel wall it is ensured that a liquid, and thus conveyable reducing agent, is provided in this part of the base in the operation of the tank system. Since the heating effect acts both into the interior of the vessel as well as toward the outside, the region of the base that receives at least parts of the heating device for avoiding an emission of non-utilized heat can delimit a volume that is disposed on the outer side of the vessel. This region of the base thus delimits not only the volume located outside the vessel but also delimits the interior of the vessel.

In order for the volume located outside the vessel to be completely delimited it is advantageous, according to a further aspect for a conveying device to be disposed as a further delimitation. A delimitation by additional wall elements is thus avoided in a cost-effective manner.

In a further particularly advantageous aspects the region of the base that receives at least parts of the heating device has at least one opening such that reducing agent located in the interior of the vessel can flow over into the volume located on the outer-side of the vessel. In as far as that volume is delimited by the conveying device, the reducing agent can be suctioned from this volume and be conveyed to the exhaust gas line. A particularly low suction point can be implemented in this manner such that the vessel can be almost completely emptied. Vessels having a very large utilizable volume can thus be implemented by way of the tank system according to this aspect of the invention. In order for a simple connection of the conveying device to the outer side of the container to be guaranteed it has proven advantageous if the conveying device has a flange surrounding the latter, and for the flange to be connected to the outer side of the vessel in order for the volume to be formed.

In another aspect, the region of the base that conjointly with the conveying device forms the volume located outside the vessel has at least one inversion directed into the interior of the vessel. This has the advantage that the conveying device can plunge into the inversion, wherein the conveying device is still disposed outside the vessel and does not protrude through the vessel base into the interior of the vessel. It is enabled by virtue of this arrangement that the conveying device can be completely disposed in the inversion. A tank system of this type therefore requires less installation space than a comparable vessel having a lower vessel wall without an inversion. The conveying device can moreover comprise further components such as filling level sensors, quality sensors, and/or filters.

BRIEF DESCRIPTION OF THE DRAWINGS

The invention will be explained in more detail by way of a plurality of exemplary embodiments. In the figures.

DETAILED DESCRIPTION OF THE PRESENTLY PREFERRED EMBODIMENTS

Figure 1:
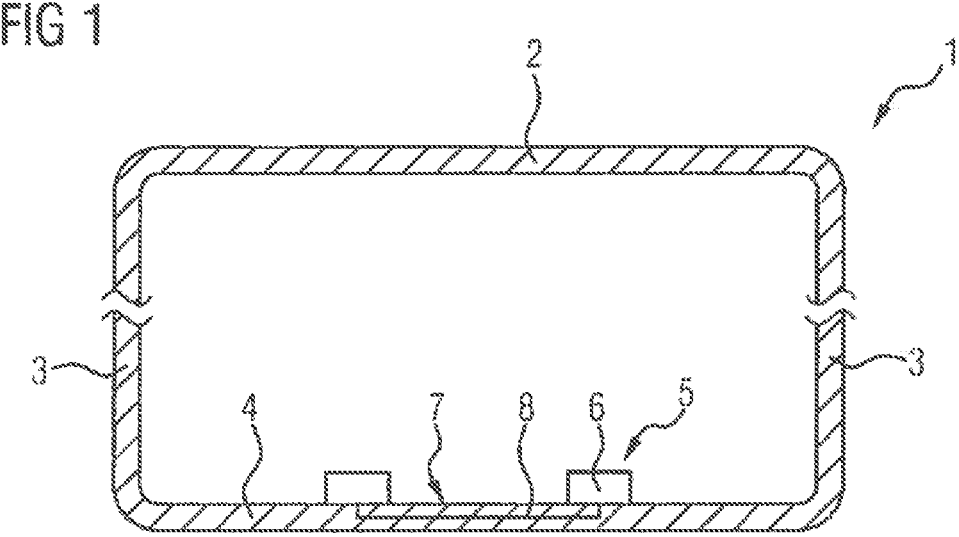
FIG. 1 shows a vessel of a tank system according to the invention.

FIG. 1 schematically shows a tank system having a vessel 1, which contains urea solution as the reducing agent. The vessel 1 in the installed position has an upper vessel wall 2, a filling portion (not illustrated) for the reducing agent, lateral vessel walls 3, and a lower vessel wall 4. The lower vessel wall 4 forms the base 7 of the vessel 1. The vessel 1 is composed of plastics. However, it is also conceivable for the vessel 1 to be produced from metal. The lower vessel wall 4 has a heating device 5. The heating device 5 is composed of heating elements 6 which are fastened to the base 7 of the vessel 1, and of a heat conducting structure 8 which, connected to the heating element 6, is disposed in the lower vessel wall 4.

Figure 2:
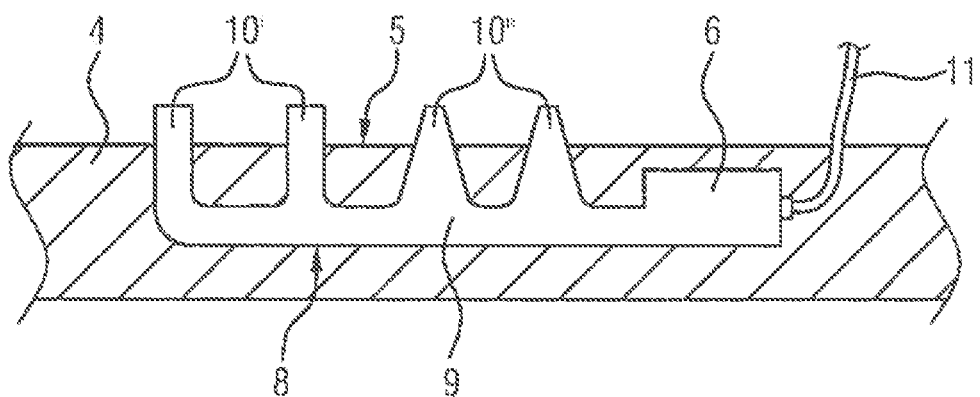
FIG. 2 shows the lower vessel region according to FIG. 1.

FIG. 2 shows an enlarged illustration of the lower vessel wall 4, having the part of the base 7 in which the heating device 5 is disposed. The heating element 6 and the heat conducting structure 8 are here disposed in the base 7 of the vessel 1. The heat conducting structure 8 is composed of a main body 9 on which shaped elements 10 are disposed. The shaped elements 10 extend away from the main body 9. The shaped elements 10 are configured such that they extend through the base 7 of the lower vessel wall 4. By extending into the interior of the vessel 1, the shaped elements 10 in this embodiment penetrate the base 7 only on one side. While the shaped elements 10 usually have the same shape, shaped elements 10' in the form of rods, and shaped elements 10" in the form of cones are illustrated in this figure. The main body 9 of the heat conducting structure 8 is connected to a heating element 6, which is likewise disposed in the lower vessel wall. Only the electrical connector lines 11 are routed out of the base 7.

Figure 3:
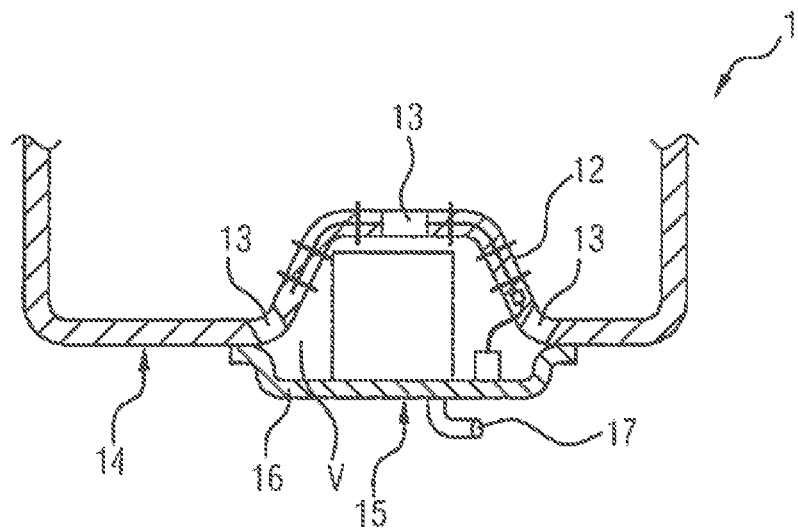
FIGS. 3, 4 show a further embodiment of the lower vessel region.

FIG. 3 shows the lower vessel wall 4, wherein the region of the base 7 that contains parts of the heating device 5 has an inversion 12. The base 7 has further openings 13, wherein the heating device 5 is configured around these openings 13. Shaped elements 10 of the heating device 5 penetrate the base 7 on both sides, and extend into the interior of the vessel 1 as well as toward the outer side 14. However; it is also conceivable for the shaped elements 10 to extend only on one aide, for example through the base 7 into the interior of the vessel 1.

A volume V, which is delimited by the part of the base 7 that receives at least parts 8, 6 of the heating device 5 and by a conveying device 15, is disposed on the outer side 14 of the vessel 1. The conveying device 15 has a flange 16, which is connected to the outer side 14 of the vessel 1. The conveying device 15 furthermore comprises an outlet 17 by way of which the urea solution for injecting into the exhaust gas is conveyed by the pump of the conveying device 15. The urea solution makes its way through the openings 13 from the interior of the vessel 1 into the volume V located outside the vessel 1. The heating device 5 is connected to conveying device 15 by way of connector lines 11 (shown in FIG. 2). However, it is also conceivable for the contact to be established by way of a plug connection instead of the connector lines 11.

Figure 4:
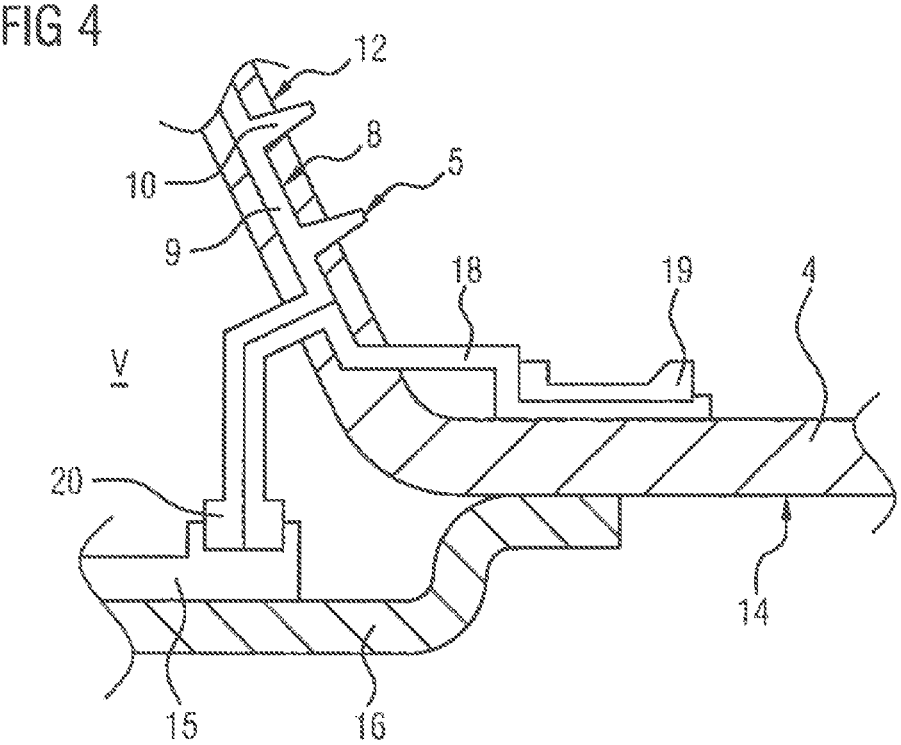

The heating device 5 is schematically illustrated in an inversion 12 of the lower vessel wall 4 in FIG. 4. A conveying device 15 is disposed outside the vessel 1 such that the flange 16 of the conveying device 15, conjointly with the outer side 14 of the vessel 1, delimits a volume V. The heating device 15 has heat conducting structures 8, comprising a main body 3 and shaped elements 10 in the form of cones extending into the interior of the vessel 1. A support 18, which protrudes from the lower vessel wall 4 into the interior of the vessel 1, is furthermore configured on the main body 9. The support 18 is configured such that it bears on the inner side of the container wall 4. An ultrasonic sensor, which is configured as a quality and filling level sensor 19, is connected to the support 18. Both the heating device 5 as well as the ultrasonic sensor 19 are electrically connected to the conveying device 15 by way of a plug connection 20.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A tank system for a reducing agent, comprising:
   a vessel (1) configured to store the reducing agent, the vessel (1) having:
      an upper vessel wall (2),
      lateral vessel walls (3), and
      a lower vessel wall (4) configured to form a base (7) of the vessel (1); and
   a heating device (5) disposed in the vessel (1),
   wherein at least parts of the heating device (5) are disposed in a part of the base (7) of the lower vessel wall (4) of the vessel (1),
   wherein the heating device (5) comprises a heat conducting structure (8) arranged at least partially in the lower vessel wall (4), and
   wherein the heat conducting structure (8) has a main body (9) and a plurality of shaped elements (10) each of which extends away from the main body (9) such that the main body (9) does not penetrate the lower vessel wall (4) and each of the plurality of the shaped elements (10) penetrate the lower vessel wall (4).

2. The tank system as claimed in claim 1, wherein the shaped elements (10) are configured so as to be at least one selected from the group of: rib-shaped, cone-shaped, and rod-shaped.

3. The tank system as claimed in claim 1, wherein the regions of the shaped elements (10) that penetrate the lower vessel wall (4) penetrate the base (7) on at least one side of the lower vessel wall (4).

4. The tank system as claimed in claim 1, wherein the heating device (5) comprises:
   heat-generating parts (6) disposed in the lower vessel wall (4) of the vessel (1), and
   electrical connector lines (11, 20) connected to the heat-generating parts (6), the electrical connector lines (11, 20) being routed out of the base (7) of the vessel (1).

5. The tank system as claimed in claim 1, wherein a part (18) from among the parts of the heating device (5) disposed in the lower vessel wall (4) of the vessel (1) extends from the base (7) and is connected to one or a plurality of components (19), for storing and conveying the reducing agent, the one or a plurality of components (19) comprising one or more selected from the group of: filters, filling level sensors, quality sensors, and pressure regulators.

6. The tank system as claimed in claim 1, wherein the part of the base (7) that receives at least parts of the heating device (5) delimits a volume (V) arranged on an outer side (14) of the vessel (1).

7. The tank system as claimed in claim 6, further comprising:
   a conveying device (15, 16) connected to the outer side (14) of the vessel (1).

8. The tank system as claimed in claim 7, wherein the part of the base (7) that receives at least parts of the heating device (5) has at least one opening (13) arranged such that reducing agent located in the interior of the vessel (1) can flow into the volume (V) arranged on the outer side (14) of the vessel (1).

9. The tank system as claimed in claim 8, wherein the part of the base (7) that delimits the volume (V) located outside the vessel (1):
   delimits the volume (V) conjointly with the conveying device (15), and
   has at least one inversion (12) directed into the interior of the vessel (1).

* * * * *